(No Model.)
W. R. FOWLER.
FLY FAN.
No. 437,921. Patented Oct. 7, 1890.
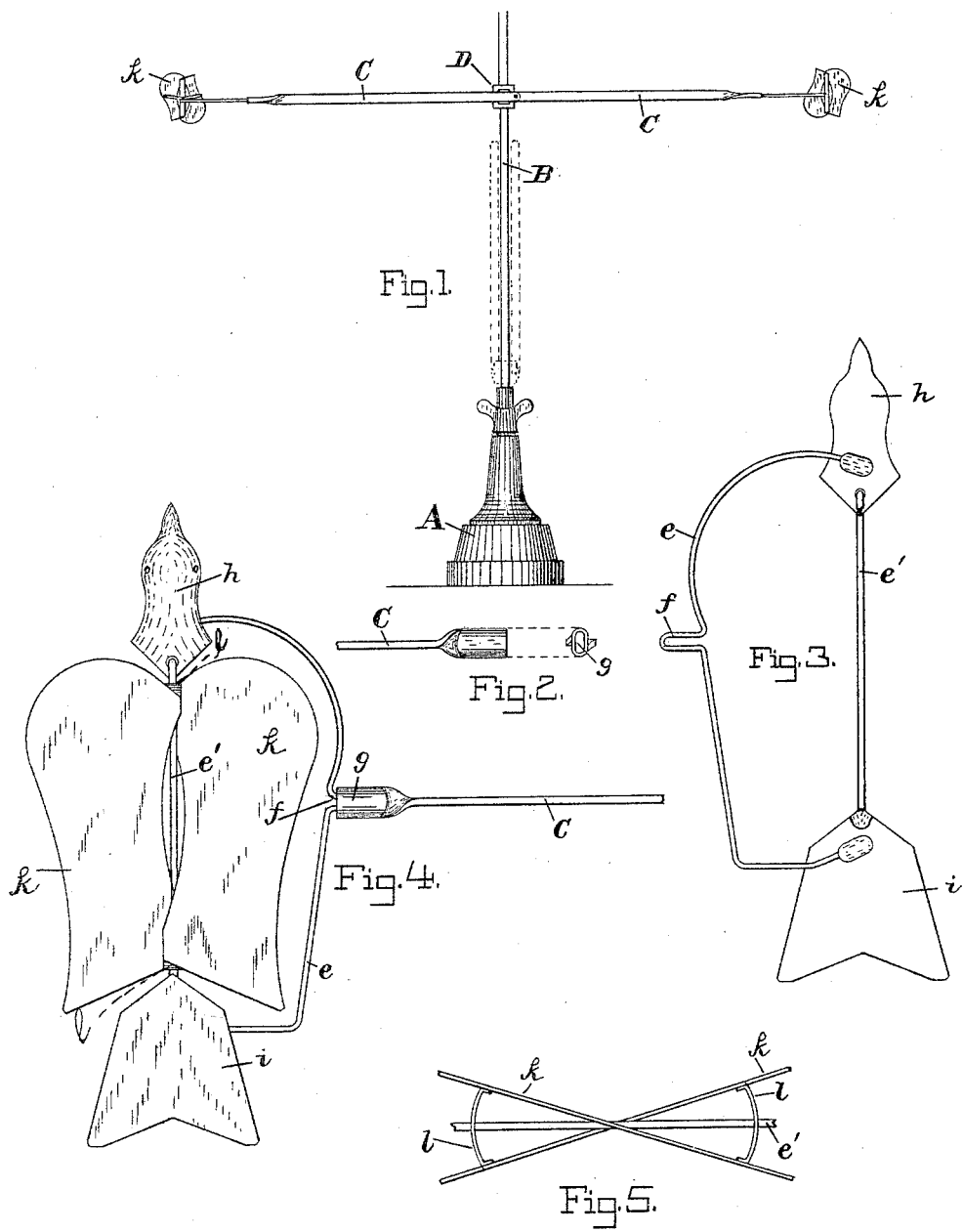
WITNESSES:
A. O. Babendreier.
R. L. Clemmitt.
INVENTOR:
Wm R. Fowler
BY Chas B. Mann
ATTORNEY.

UNITED STATES PATENT OFFICE.

WILLIAM R. FOWLER, OF BALTIMORE, MARYLAND.

FLY-FAN.

SPECIFICATION forming part of Letters Patent No. 437,921, dated October 7, 1890.

Application filed August 13, 1889. Serial No. 320,588. (No model.)

*To all whom it may concern:*

Be it known that I, WILLIAM R. FOWLER, a citizen of the United States, residing at Baltimore, in the State of Maryland, have invented certain new and useful Improvements in Fly-Fans, of which the following is a specification.

This invention relates to an improvement in automatic fly-fans, and has for its object to provide the revolving arms of an ordinary fly-fan with imitation birds or butterflies whose wings will have a motion independent of the revolving motion of said arms.

The drawings illustrate the invention.

Figure 1 is a side view of a fly-fan having my improvement. Figs. 2 and 3 show a top view of one arm with sectional parts of an imitation bird and wing holders. Fig. 4 is a top view of one arm and complete imitation bird. Fig. 5 is a detail view of the wings.

The letter A designates the base-box, which contains the motor mechanism; B, the driving-shaft projecting up from the base, and C the two arms, which are pivoted to a carrier D, which is adjustable up and down on the said driving-shaft B. All of these parts are well known and may be of any desired construction.

A holder for the bird and movable wings comprises a metal frame $e$, attached to the extremity of each arm. The shape of the holder-frame may vary from that shown in the drawings; but in the present instance it is a wire $e$, of elliptic shape. One side of the wire holder has a prong or loop-shaped lug $f$, and the end of the arm has a socket $g$, which receives the said lug. The loop-shaped lug is somewhat yielding, and is compressed by being pushed into the socket, and is thereby securely held. This construction allows the holder to be detached readily from the arm.

The side of the holder $e$ opposite the prong or lug $f$ has attached two sectional parts of an imitation bird—namely, the head $h$ and tail $i$—and the part representing the body and movable wings is mounted between said two sectional parts.

It is not important that any distinctive body part should be employed. It is essential, however, that the wings $k$ should be pivoted or mounted so as to admit of movement when the arms C revolve in a horizontal plane. To this end the two wings $k$ are set at opposite angles to each other and with respect to the axis or direct line between the head and tail. The two wings thus have position to be acted on by the air in similar fashion to the blades of a screw-propeller. In the present instance cross-bars $l$ connect the two wings, and each cross-bar has a pivot-hole, and the wire $e'$ of the holder passes through these cross-bars. Thus the two wings are connected together and both mounted loosely and so as to turn on the wire $e'$.

Instead of birds, butterflies or other winged creatures may be substituted and colors of any kind may be used to produce the desired effect.

It will be seen that as the upright shaft B revolves the arms C will turn and the angularly-placed wings $k$ will be acted on by the air in such a way as to cause them to revolve. As they revolve the motion of the wings produces the appearance of flapping. This motion also has the effect to alarm the flies.

Having described my invention, I claim—

1. The combination, with the upright revoluble shaft B and the arms C of a fan, of an imitation bird or winged creature carried by said arms and whose wings are free to move and have motion imparted to them by the action thereon of the air.

2. In a fly-fan, the combination of an arm C, revoluble in a horizontal plane, and an imitation bird or winged creature whose head and tail are in separate or sectional parts and whose wings are mounted on a support between the said two sectional parts and are free to be moved by the action of the air, as set forth.

3. The combination of the arm of a fly-fan, having at its extremity a socket $g$, a supporting-frame having a prong or lug $f$, which enters said socket, and an imitation bird or winged creature provided with movable wings and attached to said frame.

4. The combination, with a fly-fan arm, of an imitation bird or other creature having two wings serving as fan-blades and set at opposite angles, so as to be acted on by the air in similar manner to the blades of a screw-propeller.

5. The combination of a fly-fan arm, an elliptic-shaped frame attached to said arm, an imitation head and tail of a bird, both fixed on said frame, and wings revoluble between the head and tail.

6. The combination of an upright revoluble shaft B, a carrier vertically adjustable on the shaft, and two arms pivoted to said carrier and each arm provided with an imitation bird or other creature having two wings serving as fan-blades and set at opposite angles so as to be acted on by the air in a similar manner to the blades of a screw-propeller.

In testimony whereof I affix my signature in the presence of two witnesses.

WILLIAM R. FOWLER.

Witnesses:
CHAS. B. MANN,
JNO. T. MADDOX.